(12) United States Patent
Trociewitz et al.

(10) Patent No.: US 8,588,876 B1
(45) Date of Patent: Nov. 19, 2013

(54) ELECTRIC JOINT DESIGN TO BE USED IN ELECTROMAGNETIC COILS MADE WITH HIGH-TEMPERATURE SUPERCONDUCTING TAPE, ASPECTED WIRE, OR CABLE

(75) Inventors: Ulf Peter Trociewitz, Crawfordville, FL (US); David K. Hilton, Tallahassee, FL (US); Youri Viouchkov, Tallahassee, FL (US); Matthieu Dalban-Canassy, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 144 days.

(21) Appl. No.: 13/417,920

(22) Filed: Mar. 12, 2012

Related U.S. Application Data

(60) Provisional application No. 61/451,254, filed on Mar. 10, 2011.

(51) Int. Cl.
*H01L 39/24* (2006.01)
*H01B 12/00* (2006.01)

(52) U.S. Cl.
USPC .......................................... 505/220; 505/211

(58) Field of Classification Search
USPC ................... 505/163, 220, 211, 879, 926, 927
See application file for complete search history.

(56) References Cited

U.S. PATENT DOCUMENTS 7,843,292 B2 * 11/2010 Remke et al. ................ 335/216
2009/0264295 A1 * 10/2009 Nardelli et al. .............. 505/211

OTHER PUBLICATIONS

E.J. McNiff, Jr., B.L. Brandt, S. Foner, L.G. Rubin, and R.J. Weggel, Temperature anomalies observed in liquid 4He columns in magnetic fields with field-field-gradient products> 21 T2/cm, Rev. Sci. Instrum., vol. 59, No. 11, pp. 2474-2476 (1988).

* cited by examiner

*Primary Examiner* — Colleen Dunn
(74) *Attorney, Agent, or Firm* — Andriy Lytvyn; Smith & Hopen, P.A.

(57) ABSTRACT

An electric joint design to be used in electromagnetic coils made with high-temperature superconducting tape, aspected wire, or cable. A terminal member contains an engraved twist-bend contour, which receives the coil and changes the direction of the coil by about 90 degrees without any hard-bends. A current lead is aligned with terminal section of the coil establishing an electric joint whose length is not limited by the coil geometry. Resistance is distributed along the length of the electric joint to reduce heat generation. The electric joint is placed away from the area where the magnetic forces are high to eliminate the problem of helium gas becoming trapped.

18 Claims, 2 Drawing Sheets

ELECTRIC JOINT DESIGN TO BE USED IN ELECTROMAGNETIC COILS MADE WITH HIGH-TEMPERATURE SUPERCONDUCTING TAPE, ASPECTED WIRE, OR CABLE

CROSS REFERENCE TO RELATED APPLICATION

This application claims priority to U.S. Provisional Patent Application No. 61/451,254, entitled "Electric Joint Design to be Used in Electromagnetic Coils Made With High-Temperature Superconducting Tape", filed on Mar. 10, 2011, the contents of which are herein incorporated by reference.

GOVERNMENT SUPPORT

This invention was made with government support under grant No. 0923070 awarded by the National Science Foundation. The government has certain rights in the invention.

FIELD OF THE INVENTION

This invention relates to an electric joint design. More specifically, the invention relates to an electric joint design to be used in electromagnetic coils made with high-temperature superconducting tape, aspected wire, or cable for high field magnets.

BACKGROUND OF THE INVENTION

High-temperature superconductors (HTS) have been developed by research institutions and industry, and substantial efforts are currently being made to commercialize this technology. Two large sets of applications are currently driving the commercialization efforts: power generation and transport and high field magnet systems. One example of HTS is Rare Earth Barium Cuprates (REBCO) coated tape, which has demonstrated a great potential for high field magnets by retaining the superconducting state in fields above 100 T at liquid helium temperatures, whereas materials that are currently used to build superconducting magnets, i.e. Nb—Ti and $Nb_3Sn$, can only operate in fields below 25 T.

For technological reasons, HTS materials are commonly manufactured as tape, and therefore, engineering approaches normally applied to round wires are inapplicable to HTS tape. Due to the geometrical and mechanical constraints, tape conductors cannot be easily bent to change direction when entering and exiting the coil section at some pre-determined winding pitch angle. There are two bending modes for a tape conductor with respect to the conductor's broad surface: a soft bend, which is an out of plane bend, and a hard-bend, which is an in-plane bend. Minimum bending radii of soft-bends are on the order of several millimeters and are significantly smaller than minimum bending radii of hard-bends, which are on the order of several centimeters. For this reason, hard-bends result in degradation of the electrical transport properties of the conductor and, therefore, are undesirable.

HTS tape is produced in pieces of relatively short length, thus requiring electrical joints between the pieces. Since currently no technology exists that allows for making of superconducting joints with HTS materials, all electrical joints are resistive and contribute to the total heat generation of the coil. Common joint technologies include various approaches involving overlapping pieces of conductor tape in attempt to achieve sufficiently low contact resistance.

A major problem associated with HTS high field magnets is "trapping" of helium gas. High field magnets utilizing HTS materials are cooled by liquid helium. Due to its low thermal capacity and latent heat of vaporization, liquid helium easily transitions into the gas phase when in contact with a heat source, resulting in drastically reduced cooling of the coil if the gas is not replaced by liquid within that region. A well documented phenomenon is the trapping of helium gas in areas where the magnetic force, which is proportional to the product of magnetic field and field gradient, is at its highest. An effective magnetic moment exists in boiling liquid helium because of the differences in the dielectric moment of helium gas and liquid. This is typically the case at the ends of solenoid coils, where generated heat may cause the helium gas to remain and accumulate.

Coincidentally, the ends of solenoid coils are also the areas where the electrical connections between the coil and the current leads, which connect the coil to a power supply outside of the cryogenic environment, have to be established. Typically, these connections are made in resistive joints located within this critical region at the inner and outer first turn of the coil. These resistive joints can generate a lot of heat, and, due to liquid helium being converted to gas, the joint may become insufficiently cooled, causing the coil to either not perform at its fullest potential or not maintain its superconducting properties and fail.

Accordingly, there is a need for an electromagnetic coil system for use in high field magnets utilizing high-temperature superconductors, where the coil system contains long distributed resistive joints to reduce contact resistance, heat generation, and reduce the helium gas trapping problem.

SUMMARY OF THE INVENTION

The concept of the claimed invention is to run a high-temperature superconductor without interruption all the way from the top of the coil along some part of the current lead and establish a distributed resistive joint outside of the area where the magnetic forces are high and helium gas may be trapped.

One embodiment of this invention involves soldering of a high-temperature superconductor onto a complex twist-bend contour in a terminal member. The conductor may be a high-temperature superconducting tape, aspected wire, or cable. The terminal member is made of an electrically conductive material, such as high purity copper. The twist-bend contour allows for a change in the conductor direction by about 90 degrees as the conductor leaves the helical section of the coil. This change in direction is achieved through a soft-bend and an internal twist without cutting the conductor or forcing a hard-bend into it. After the twist-soft-bend section of the contour, the conductor is aligned with the electric current leads. As the conductor is soldered onto the terminal along the path of the contour, including the twist-bend and the linear part, the current leads can be positioned away from the area of high magnetic forces. This makes it possible for current transfer to take place outside of the region where helium gas trapping is an issue. In addition, since the conductor is aligned with the current lead, there is no hard-bend limit on the length of the electric joint, which allows for the design of long joints with low contact resistance and, hence, small heat losses. In addition, the incoming and outgoing current leads may be located in close proximity so that Lorentz forces can balance each other.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The claimed invention solves the problem associated with heat generating resistive joints in high temperature superconductor coil terminals used in high field magnets.

Figure 1:
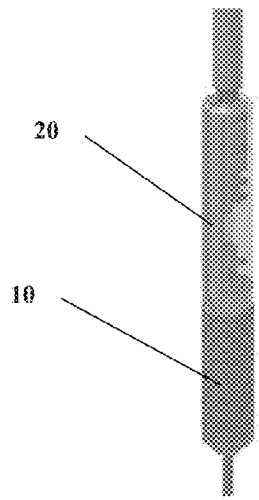
FIG. 1 is an illustrative depiction of the outer coil layer and the terminal member.
Figure 2:
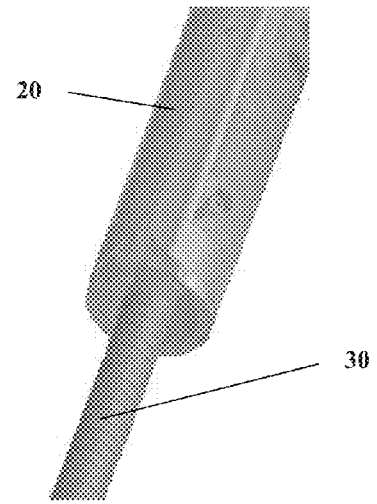
FIG. 2 is an illustrative depiction of the inner coil layer and the terminal member.

Referring to FIGS. 1-2, one embodiment of the claimed invention involves a coil having an outer layer 10 and an inner layer 30. The coil is made of a high-temperature superconductor (HTS), which may be in a form of a tape, aspected wire, or cable. One type of HTS material contemplated by the invention is Rare Earth Barium Cuprates (REBCO) coated tape. Outer coil layer 10 has a helical section depicted in FIGS. 1 and 3, and a terminal section 60 depicted in FIG. 4; inner coil layer 30 has a helical section, which is depicted in FIG. 2, and a terminal section 70, which is depicted in FIG. 4.

Figure 3:
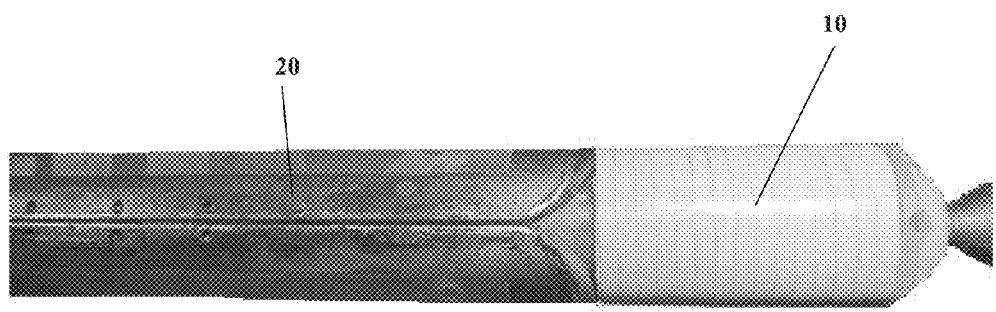
FIG. 3 is a photograph depicting a top view of the invention.

FIGS. 1-3 depict a terminal member 20, which is made of an electrically conductive material, such as high purity copper. Terminal member 20 contains a complex bend-twist contour 40, which is depicted in FIG. 4. Contour 40 receives coil terminal sections 60 and 70. One way of achieving this is by soldering terminal sections 60 and 70 onto contour 40 starting from the point where the conductor leaves the helical sections of coil layers 10 and 30.

Contour 40 allows for a change in direction of the conductor by about ninety degrees. The change in direction is achieved through a soft-bend and an internal twist without cutting the conductor or forcing a hard-bend into it. Contour 40 may be visualized by taking a straight piece of tape, twisting it by ninety degrees around the rolling direction, and then bending it by ninety degrees out of the straight line.

Figure 4:
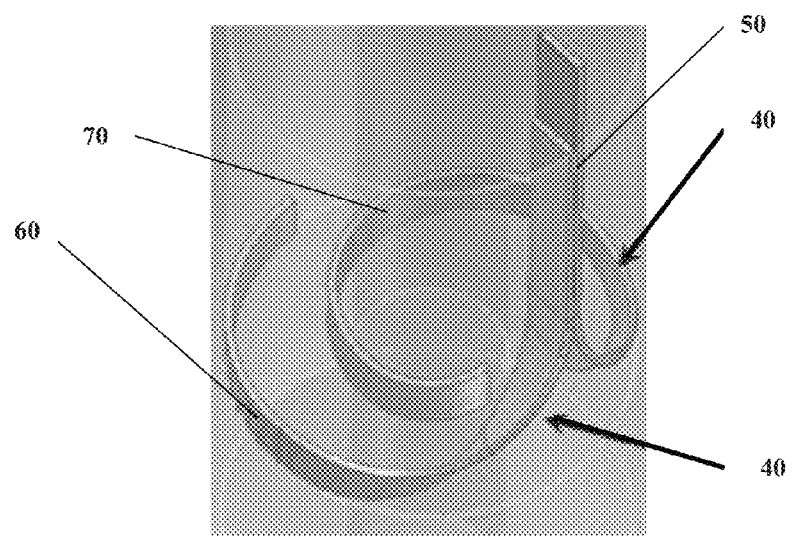
FIG. 4 is an illustrative depiction of the twist-bend contour.

Electric current leads connecting coil layers 10 and 30 to a power supply are aligned with coil terminal sections 60 and 70 establishing electric joints 50 (FIG. 4). Since the current leads and terminal sections 60 and 70 are aligned, there is no coil-specific limit on the length of electric joints 50, allowing for long joints with low contact resistance and reduced heat generation. Due to the twist-bend design of contour 40, coil geometry imposes no limitations on the length of electric joint 50, and, therefore, resistance of electric joint 50 can be distributed over the length of the lead. The current transfer between the leads and coil layers 10 and 30 occurs away from the area where magnetic forces are high, thus, eliminating the problem of helium gas becoming trapped. In addition, the incoming and outgoing current leads may be positioned in close proximity to each other to achieve balancing of Lorentz forces.

Figure 5:
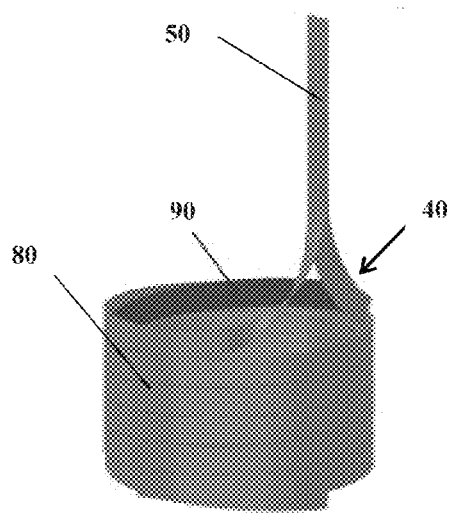
FIG. 5 is an illustrative depiction of an embodiment involving two nested coils.
Figure 6:
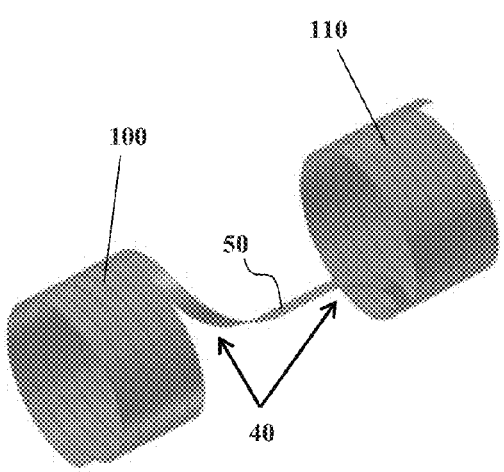
FIG. 6 is an illustrative depiction of an embodiment where two coils are arranged in a split coil configuration.

Referring to FIG. 5, an alternative embodiment of the invention involves two coils 80 and 90 with nested helical sections, wherein terminal sections of coils 80 and 90 establish electrical joint 50. Another embodiment, which is depicted in FIG. 6, involves electric joint 50 being established between a lower coil 100 and an upper coil 110 whose helical sections are arranged in a split coil configuration. This embodiment is advantageous when lateral access to the center plane of the high field magnet is required.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:

1. An electric joint design for use in high field magnets comprising:
    a high-temperature superconductor coil having a helical section and a terminal section;
    a terminal member containing a twist-bend contour receiving the terminal section of the coil;
    an electrical current lead connecting a power supply to the coil, the current lead being aligned with the terminal section of the coil establishing an electric joint of a predetermined length.

2. The electric joint design of claim 1, further comprising:
    the high-temperature superconductor coil having an inner layer and an outer layer.

3. The electric joint design of claim 1, further comprising:
    the terminal member being of an electrically conductive material.

4. The electric joint design of claim 3, wherein the electrically conductive material is high purity copper.

5. The electric joint design of claim 1, wherein the high-temperature superconductor is selected from the group consisting of a high-temperature superconducting tape, a high-temperature superconducting aspected wire, and a high-temperature superconducting cable.

6. The electric joint design of claim 1, further comprising:
    liquid helium being used as cryogenic coolant to cool the high-temperature superconductor coil.

7. The electric joint design of claim 1, further comprising:
    the twist-bend contour having a soft-bend and an internal twist changing the direction of the high-temperature superconductor by about 90 degrees as the coil transitions from the helical section to the terminal section.

8. The electric joint design of claim 1, further comprising:
    the electric joint being located away from an area of high magnetic forces.

9. The electromagnetic coil system for use in high field magnets comprising:
    a first high-temperature superconductor coil and a second high-temperature superconductor coil, each coil having a helical section and a terminal section;
    a terminal member containing a twist-bend contour receiving the terminal sections of the first coil and the second coil; and
    an incoming electrical current lead and an outgoing electrical current lead, the incoming lead being aligned with the first coil, the outgoing lead being aligned with the second coil establishing electrical joints of predetermined lengths.

10. The electromagnetic coil system of claim 9, further comprising:
    the incoming lead and the outgoing lead being located in close proximity to each other to achieve a balance of Lorentz forces.

11. The electromagnetic coil system of claim 9, further comprising:
the first coil being nested inside the second coil.

12. The electromagnetic coil system of claim 9, further comprising:
the first coil and the second coil being arranged in a split coil configuration.

13. The electromagnetic coil system of claim 9, further comprising:
the terminal member being of an electrically conductive material.

14. The electromagnetic coil system of claim 13, wherein the electrically conductive material is high purity copper.

15. The electromagnetic coil system of claim 9, wherein the high-temperature superconductor is selected from the group consisting of a high-temperature superconducting tape, a high-temperature superconducting aspected wire, and a high-temperature superconducting cable.

16. The electromagnetic coil system of claim 9, further comprising:
liquid helium being used as cryogenic coolant to cool the electromagnetic coil system.

17. The electromagnetic coil system of claim 9, further comprising:
the twist-bend contour having a soft-bend and an internal twist changing the direction of the high-temperature superconductor by about 90 degrees as each coil transitions from the helical section to the terminal section.

18. The electromagnetic coil system of claim 9, further comprising:
the electric joint being located away from an area of high magnetic forces.

\* \* \* \* \*